United States Patent [19]
Schirm, IV

[11] Patent Number: 5,208,562
[45] Date of Patent: May 4, 1993

[54] BUS TERMINATOR CIRCUIT HAVING RC ELEMENTS

[75] Inventor: Louis Schirm, IV, Yorba Linda, Calif.

[73] Assignee: ISP Technologies, Inc., Anaheim, Calif.

[21] Appl. No.: 772,223

[22] Filed: Oct. 7, 1991

[51] Int. Cl.$^5$ .............................. H01P 1/24
[52] U.S. Cl. .................... 333/22 R; 307/443
[58] Field of Search ............... 333/22 R; 307/443

[56] References Cited

U.S. PATENT DOCUMENTS

| | | | |
|---|---|---|---|
| 3,585,399 | 6/1971 | Andrews, Jr. | 307/443 |
| 4,310,812 | 1/1982 | DeBlodis | 333/81 A |
| 4,553,050 | 11/1985 | Feinberg et al. | 307/443 |
| 4,626,804 | 12/1986 | Risher et al. | 333/22 R |
| 4,703,302 | 10/1987 | Hino et al. | 338/233 |
| 4,748,426 | 5/1988 | Stewart | 333/22 R |
| 4,804,940 | 2/1989 | Takigawa et al. | 341/133 |
| 4,882,554 | 11/1989 | Akaba et al. | 333/105 |
| 5,086,271 | 2/1992 | Haill et al. | 333/22 R X |

FOREIGN PATENT DOCUMENTS

| | | | |
|---|---|---|---|
| 79551 | 6/1981 | Japan | 333/22 R |
| 190003 | 7/1989 | Japan | 333/22 R |

*Primary Examiner*—Robert J. Pascal
*Assistant Examiner*—Benny Lee
*Attorney, Agent, or Firm*—LaValle D. Ptak

[57] ABSTRACT

A power bus terminator circuit for use with personal computers and the like is designed to hold the circuit termination pins at a pre-established voltage while dissipating a relatively small amount of power (approximately 20 mW) during steady state operation. This is accomplished by connecting sets of first and second high impedance resistors together at a terminal, and in series between the bus terminator pins. Each of the terminals is connected through a relatively low value resistor to each one of the circuit termination pins, and through a capacitor, to one of the bus terminals to permit high-speed operation of the AC switching transitions of the circuits coupled to the termination pins. A relatively low amount of power (approximately another 30 mW or so) is consumed during the transitions of the signals appearing on the termination pins. The circuit results in a power dissipation reduction of between 90% to 75% over standard bus terminator circuits.

13 Claims, 1 Drawing Sheet

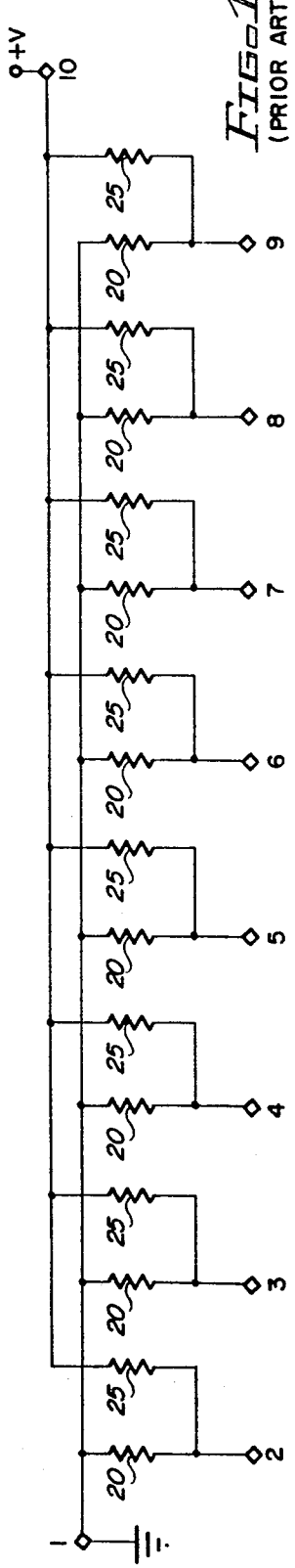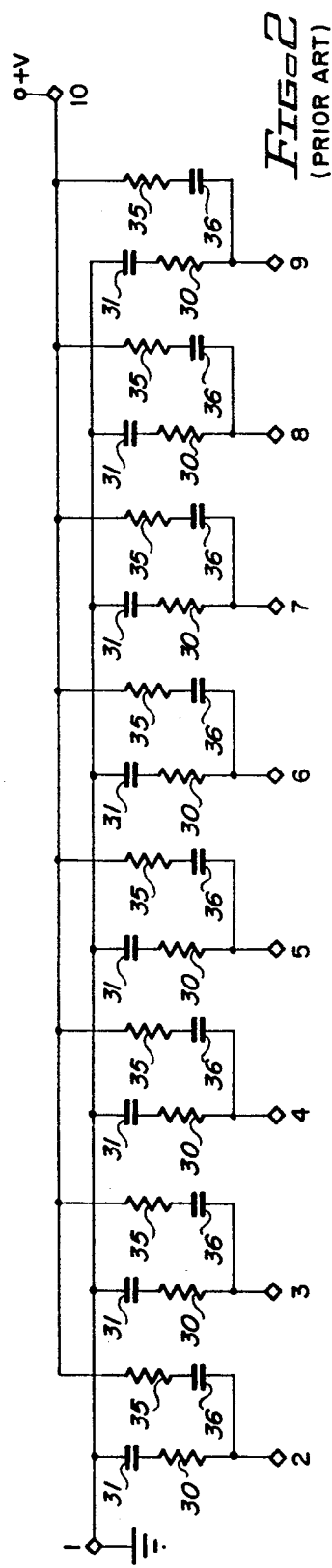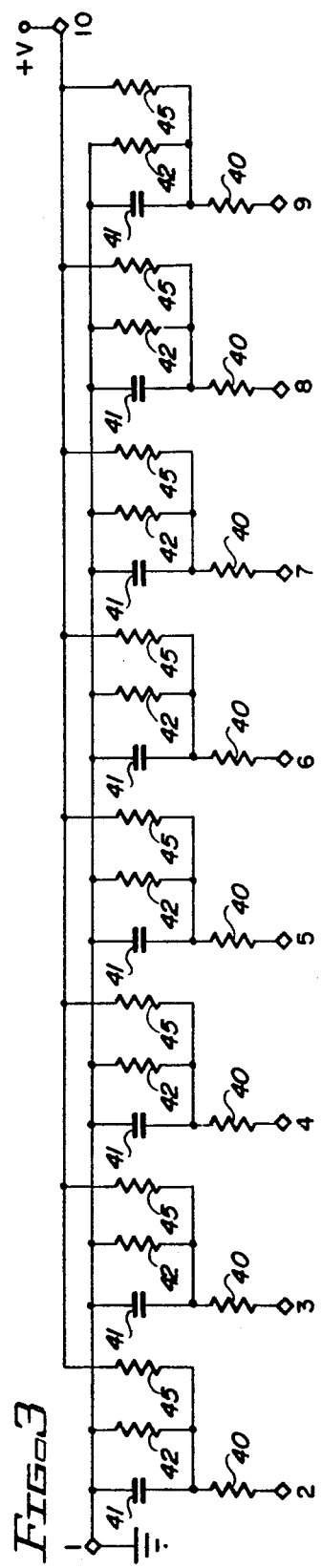

BUS TERMINATOR CIRCUIT HAVING RC ELEMENTS

BACKGROUND

The various signal busses which are used in personal computers, laptop computers, battery-operated surveillance equipment, various types of military hardware, and the like, increasingly are required to operate at high speed and to consume as little power as possible. A widely used high-speed bus terminator has a plurality of resistor-only networks interconnecting the two bus pins of the terminator circuit. The junctions between different pairs of "pull-up" and "pull-down" resistors then are coupled to the circuit termination pins of the system using the terminator circuit.

The circuits connected to the termination pins frequently are CMOS TTL circuits, many of which require a standby voltage at the pin to which they are connected. This is provided by such a resistor network by the constant dissipation of power through the bus terminator circuit. A continuous current flow takes place through the two resistors for each of the circuit termination pins.

A problem with this type of circuit, however, is that this continuous standby current of the bus terminator circuit dissipates a substantial amount of power. In many operations, several bus terminator circuits exist; and each of these terminator circuits continuously consume power in the standby condition. In addition, when the circuit termination pins are actively driven by the circuits connected to them, a significant additional amount of power is dissipated; so that irrespective of the operation of the system using the bus terminator circuit, power is dissipated in a significant amount at all times. For battery-operated devices, this results in a relatively rapid discharge of the battery. A system of this general type is disclosed in the patent to Risher U.S. Pat. No. 4,626,804. The full direct current path is present in the standby condition of operation, and the system of this patent simply adds a power supply de-coupling capacitor to the resistor-resistor terminator circuit.

Another approach, which has been employed to eliminate the consumption of power during standby conditions of operations, is disclosed in the patent to Feinberg U.S. Pat. No. 4,553,050. The terminator circuit of this patent blocks the high current direct current path with capacitors to cause "Zero" power consumption during standby operation of the terminator circuit. A problem with the circuit of Feinberg, however, is that the capacitors leave the circuit termination pins floating during the quiescent condition of operation, when no active drivers are connected to the circuit termination pins. Thus, the quiescent voltage on the termination pins is indeterminate, and for CMOS circuits this is dangerous, since many CMOS circuits require a fixed standby voltage at the pin to which they are connected. Consequently, the system of the patent to Feinberg cannot be used for such CMOS circuits.

It is desirable to provide a bus terminator circuit which minimizes the dissipation of power during standby and active operation, which maintains a pre-established standby voltage on the circuit termination pins, which is capable of high-speed operation, and which overcomes the shortcomings of the prior art.

SUMMARY OF THE INVENTION

It is an object of this invention to provide an improved bus terminator circuit.

It is an additional object of this invention to provide an improved bus terminator circuit having minimum power dissipation.

It is another object of this invention to provide an improved high-speed, low-power bus terminator circuit.

It is a further object of this invention to provide an improved high-speed low power bus terminator circuit utilizing a high resistance divider network to provide a standby potential on the circuit terminator pins, with minimum power dissipation, and having a relatively low impedance path for high speed signals applied to the circuit terminator pins.

In accordance with a preferred embodiment of the invention, a bus terminator circuit includes first and second bus pins connected, respectively, to two different potentials. First and second resistors are connected together at a first junction, and in series with one another, between the first and second bus pins to cause a pre-established steady state voltage to appear on the first junction. A circuit termination pin then is connected through a third resistor to the first junction and a first capacitor is connected between the second bus pin and the first junction. The value of the third resistor is substantially less than the value of resistance of the first and second resistors; so that the circuit is capable of high speed operation in response to signal transitions supplied to the circuit termination pin.

BRIEF DESCRIPTION OF THE DRAWING

FIG. 1 is schematic circuit diagram of a prior art circuit;

FIG. 2 is a schematic circuit diagram of a different prior art circuit; and

FIG. 3 is a schematic circuit diagram of a preferred embodiment of the invention.

DETAILED DESCRIPTION OF THE INVENTION

Reference now should be made to the drawing, and, specifically, to the prior art bus terminator circuit of FIG. 1. The circuit of FIG. 1 is a conventional resistor-only bus terminator network shown as a standard ten pin network. Pin 1 is connected to ground, and pin 10 is connected to a source of positive operating potential +v (typically +5 Volts DC). The remaining pins, 2 through 9, comprise circuit termination pins which, typically, are connected to CMOS TTL switching circuit outputs. Each of the circuit termination pins, 2 through 9, connected to the junction of a pair of "pull-down", "pull-up" resistors 20 and 25 connected in series, respectively, between the pins 1 and 10. Consequently, the eight resistor-resistor circuits 20, 25 each are connected in parallel with one another between the pins 1 and 10, as shown in FIG. 1.

Typically, in personal computers and similar devices currently in widespread use, the resistors 20 and 25 have resistance values of 330 and 470 Ohms, respectively. More recently, for faster computer circuits, the resistance values of these resistors 20 and 25 are 220 and 330 Ohms, respectively. It is readily apparent that interconnecting resistor-resistor terminator parts, as shown in the prior art circuit of FIG. 1, results in the dissipation of a relatively high amount of power during steady state or "no signal" activity. The power dissipation increases from this relatively high base or steady state level a lesser amount as the termination pins 2 to 9 are driven to a relatively high positive potential, and to a greater amount if all of the pins are driven to a relatively low potential (assuming that pin 1 is connected to ground and pin 10 is connected to +5 Volts, as illustrated). As a result, no matter what nature of signals are supplied from the circuits connected to the termination pins 2 through 9 at any given time, power constantly is dissipated by the terminator circuit. Since many applications use multiple bus terminator strips of the type shown in FIG. 1, the power dissipation or power loss is significant. This is a particular problem for battery-operated devices, such as laptop computers, and the like, since the life of the battery, or the length of time the computer can be run on a single charge of a battery, is directly inversely proportional to the power dissipation of all of the devices used in the computer.

The circuit of FIG. 2 is another prior art approach, which has been implemented to eliminate the standby power dissipation of the circuit of FIG. 1. The circuit of FIG. 2 includes a series resistor and capacitor combination 30, 31, connected between pin 1 and each of the circuit termination pins 2 through 9, and a second resistor 35 and capacitor 36 connected in series with one another between pin 10 (connected to +v) and each of the circuit termination pins. The relative values of the resistors 30 and 35 are comparable to the values of the resistors 20 and 25 of the circuit shown in FIG. 1. It is readily apparent from an examination of the circuit of FIG. 2 that the series-connected capacitors 31 and 36 prevent any standby current whatsoever from flowing between the pins 1 and 10 when the circuit is in its standby mode of operation. As a result, "Zero" power is dissipated by the circuit during standby.

A problem with the circuit of FIG. 2, however, is that system circuit components, which are connected to the circuit termination pins 2 through 9, are left floating. The potential on the termination pins 2 to 9 essentially is uncertain. Since pins 2 to 9 frequently are driven by CMOS TTL circuits, some of these circuits require a pre-established standby voltage at the pin to which they are connected. For such applications, the circuit of FIG. 2 cannot be used. Consequently, limited applications for this circuit exist, and it cannot be universally used.

The circuit of FIG. 3 is directed to a preferred embodiment of the invention which overcomes the disadvantages of the prior art circuits shown in FIGS. 1 and 2. The circuit of FIG. 3 has some of the common characteristics of both the circuits of FIGS. 1 and 2, but differs significantly from both of them. In order to provide a pre-established standby voltage on the circuit termination pins 2 through 9, a pair of very large resistors 42 and 45 are connected together at a junction, and in series with one another, between the pins 1 and 10 (connected to ground and to +v, respectively) for each of the circuit termination pins 2 through 9. The junction between each of these large value resistors 42 and 45 is connected to the respective circuit termination pin 2 through 9 through a third, much lower value resistor 40. For a typical installation, the resistor 42 has a value of 8,000 Ohms, the value of the resistor 45 is 2,000 Ohms, and the value of the resistor 40 is 75 Ohms.

Thus, it is readily apparent that the current flowing between pins 1 and 10 during standby conditions, when no signals are applied to the circuit termination pins 2 through 9, is very low. This results in a significantly reduced power dissipation of the circuit, and constitutes a tenfold improvement over the circuit of FIG. 1.

The large value resistors 42 and 45, however, cannot be used to switch the signal voltage levels in a high-speed operation. To accomplish this, a 200 PF capacitor 41 (a typical value) is connected between pin 1 and the junction of the resistors 40, 42, and 45 for each of the circuit termination pins 2 through 9, as shown. The result of this circuit configuration is that whenever the signal on any of the circuit termination pins 2 through 9 is switched from one voltage level to another, the switching is effected rapidly through the low value resistor 40 and the capacitor 41 to provide the desired high-speed switching operation.

The circuit shown in FIG. 3 is matched to the characteristic impedance of 20 Mhz and higher busses which currently are being operated in many personal computers and laptop computers. The circuit also draws between 0 and 50 milliwatts of power, depending upon the power connections and the bus speed statistics. The circuit of FIG. 3 dissipates approximately 20 mW while holding the standby potential or voltage on the circuit termination pins 2 through 9 at four Volts (when +5 Volts is applied to pin 10 and pin 1 is grounded, as shown). An additional 30 mW or so of power is dissipated during transitions of signals. No additional power is added during steady state signals, since the capacitors 41 block the flow of current through the resistors 40 during steady state signals.

It is apparent from an observation of the circuit interconnections of FIG. 3, taken in conjunction with the description of operation given above, that the transient or switching signal path for signals applied to the circuit termination pins 2 through 9 is completely independent of the current path established for maintaining the steady state or standby potential on the circuit termination pins 2 through 9. Because of this unique circuit configuration, the resistors 42 and 45 may be configured with the large values of impedance mentioned, while permitting very low values of impedance to be employed for the resistor 40 in the circuit.

It should be noted that the values which have been described in conjunction with the circuit of FIG. 3, are not to be considered restrictive. The 75 Ohm value for the resistors 40 could as easily be 50 Ohms for more tightly controlled impedance type signals, or some other value, depending on the hybrid and how much cross talk noise can be tolerated in the analog circuit. Similarly, the impedance values given for the resistors 42 and 45 may be greater than the values mentioned, if desired. The resultant, however, is that the circuit is capable of high-speed operation; and at the same time, the power consumption of the bus terminator circuit is significantly reduced. Power dissipation reductions of between 90% and 75% have been realized with operating versions of the circuit of FIG. 3.

For some applications, pins 1 and 10 of FIG. 3 may be connected together to the same source of potential, or pin 10 may be connected to a lower potential than pin 1. The operation characteristics of the circuit are otherwise unchanged from the specific example described above.

The foregoing description of the preferred embodiment of the invention should be taken as illustrative, and not as limiting of the invention. Various changes and modifications will occur to those skilled in the art without departing from the true scope of the invention as defined in the appended claims.

I claim:

1. A bus terminator circuit including in combination:
a first bus pin;
a second bus pin;
first and second resistors having first and second predetermined values of resistance, each of said first and second resistors having first and second ends, with the second end of said first resistor connected at a first junction to the first end of said second resistor and the first end said first resistor connected to said first bus pin and the second end of said second resistor connected to said second bus pin;
a circuit termination pin;
a first capacitor having first and second terminals, with the first terminal of said first capacitor connected to said second bus pin and the second terminal of said first capacitor connected to said first junction; and
a third resistor having first and second ends, with the first end thereof connected to said first junction and the second end of said third resistor connected to said circuit termination pin, said third resistor having a third predetermined value of resistance substantially less than said first and second predetermined values of resistance.

2. The combination according to claim 1 wherein the value of resistance of said second resistor is greater than the value of resistance of said first resistor.

3. The combination according to claim 1 further including means connected to said first and second bus pins for applying potential thereto, wherein the potential applied to said second bus pin is different from the potential applied to said first bus pin.

4. The combination according to claim 3 wherein the resistance value of said third resistor is less than 100 OHMS, and the resistance value of each of said first and second resistors is in excess of 1000 OHMS.

5. The combination according to claim 4 wherein the value of resistance of said second resistor is greater than the value of resistance of said first resistor.

6. The combination according to claim 5 wherein said means for applying potential to said first bus pin supplied direct current operating potential, and said means for applying potential to said second bus pin supplies ground potential.

7. The combination according to claim 1 further including means connected to said first bus pin for supplying direct current operating potential to said first bus pin, and means connected to said second bus pin for supplying ground potential to said second bus pin.

8. The combination according to claim 7 wherein the resistance value of said third resistor is less than 100 OHMS, and the resistance value of each of said first and second resistors is in excess of 1000 OHMS.

9. A power bus terminator circuit including in combination:
a first bus pin;
a second bus pin;
a predetermined number of sets of first and second resistors, each resistor having first and second ends, with the second end of the first resistor in each set connected to the first end of the second resistor of each set to realize a predetermined number of first junctions corresponding to said predetermined number of sets of resistors, with the first ends of said first resistors connected to said first bus pin, and the second ends of said second resistors connected to said second bus pin;
a predetermined number of circuit termination pins equal in number to said predetermined number of sets of first and second resistors;
a predetermined number of first capacitors, each having first and second terminals, with the first terminal of each of said first capacitors connected to said second bus pin and the second terminal of each of said first capacitors connected to a different one of said predetermined number of first junctions; and
a predetermined number of third resistors, each having first and second ends, with the first ends thereof each connected to a different one of said first junctions, and the second ends of said third resistors each connected to a different one of said circuit termination pins.

10. The combination according to claim 9 wherein each of said predetermined number of third resistors has a resistance of less than 100 OHMS, and each of said first and second resistors in said predetermined number of sets of such resistors has a resistance of over 1000 OHMS.

11. The combination according to claim 10 further including means connected to said first bus pin for applying direct current operating potential to said first bus pin and means connected to said second bus pin for applying ground potential to said second bus pin.

12. The combination according to claim 9 further including means connected to said first bus pin for applying direct current operating potential to said first bus pin, and means connected to said second bus pin for applying ground potential to said second bus pin.

13. The combination according to claim 12 wherein each of said predetermined number of third resistors has a resistance of less than 100 OHMS, and each of said first and second resistors in said predetermined number of sets of such resistors has a resistance of over 1000 OHMS.

* * * * *